Feb. 16, 1943.     A. L. PARKER     2,311,465
VALVE ASSEMBLY
Filed Dec. 26, 1940     2 Sheets-Sheet 1
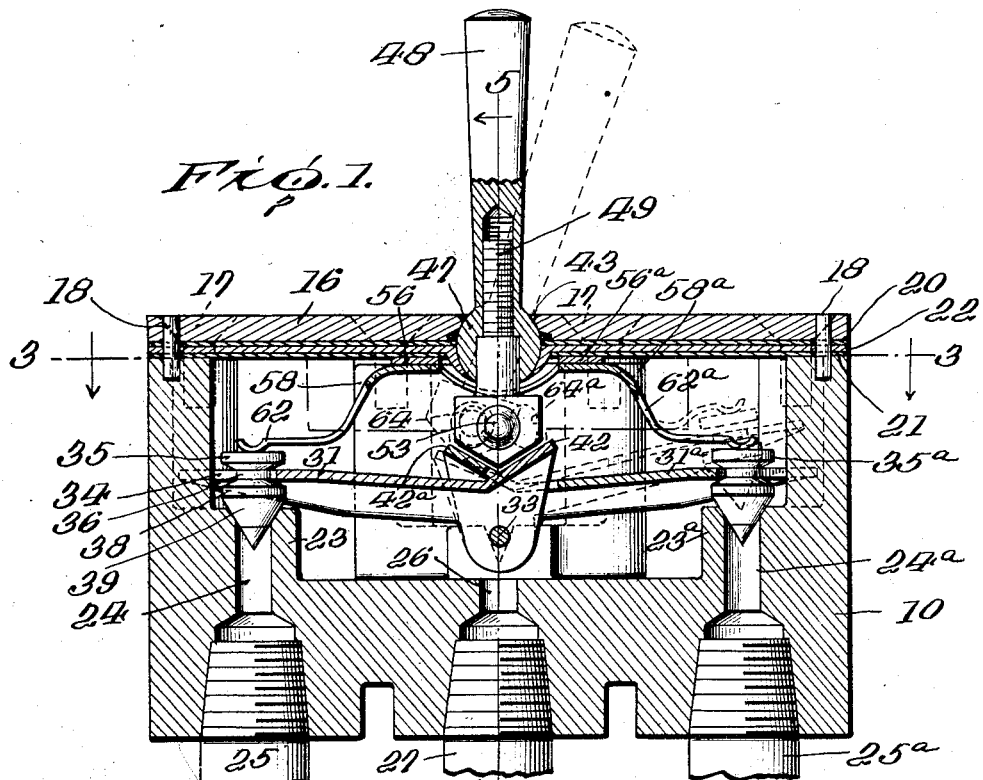
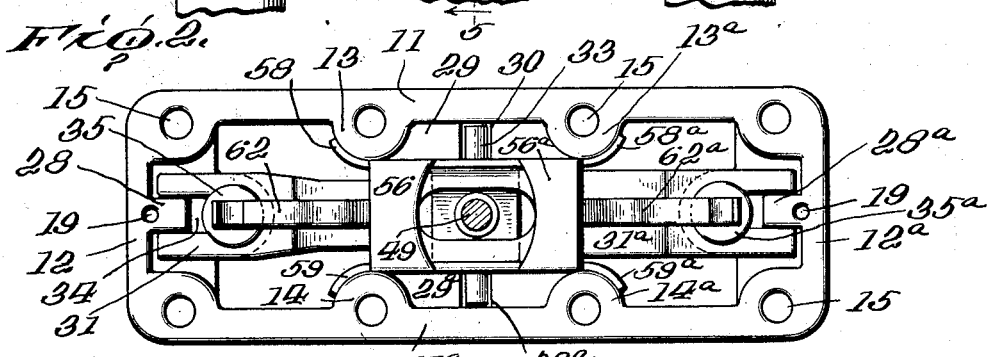
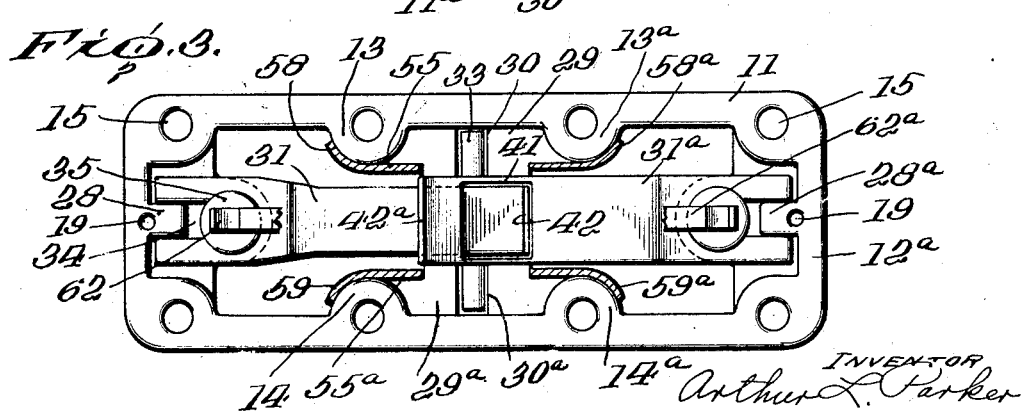

Feb. 16, 1943. A. L. PARKER 2,311,465
VALVE ASSEMBLY
Filed Dec. 26, 1940 2 Sheets-Sheet 2
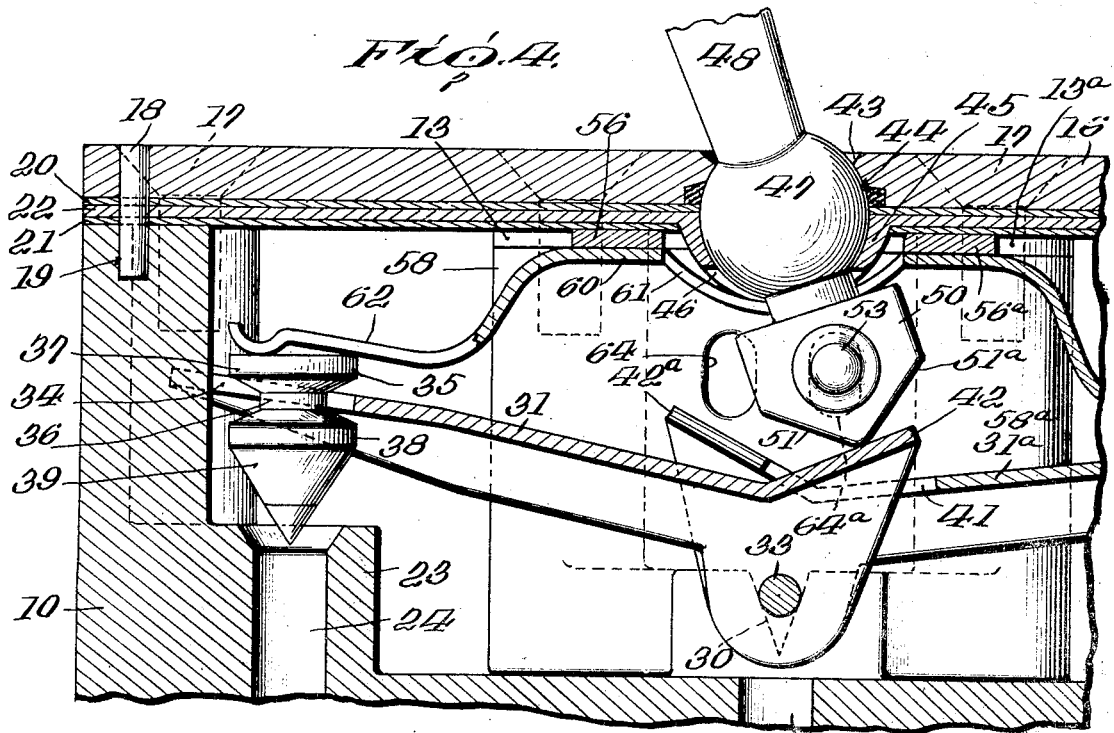
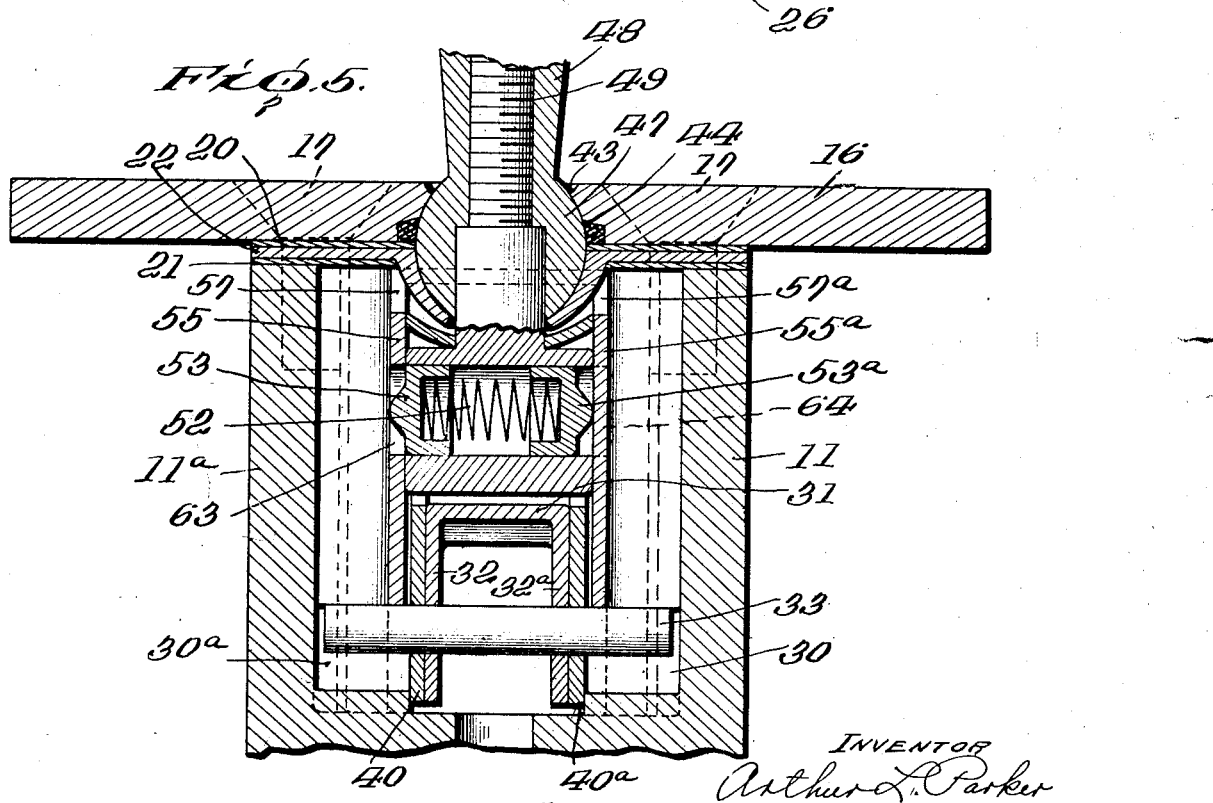
INVENTOR
Arthur L. Parker
By Mason & Porter
ATTORNEYS Patented Feb. 16, 1943

2,311,465

UNITED STATES PATENT OFFICE 2,311,465

VALVE ASSEMBLY

Arthur L. Parker, Cleveland, Ohio

Application December 26, 1940, Serial No. 371,806

9 Claims. (Cl. 277—20)

The present invention relates to new and useful improvements in a valve assembly, and more particularly to improvements in a valve assembly for selectively controlling the passage of fluid through a plurality of conduits.

In numerous installations, a differential pressure system is employed for operating various types of devices. In aircraft, for instance, a differential pressure system of the vacuum type is often employed for operating various instruments, such as a gauge, and other devices. In such systems, it is desirable to provide a plurality of fluid conduits which may be selectively employed by manipulation of a valve mechanism. These conduits may lead from a single source of supply or from separate sources of supply and similarly, a plurality of conduits may lead to the device to be operated so that if one conduit becomes damaged or broken, another conduit may be employed. The valve mechanism of the present invention is particularly designed to selectively control the passage of fluid through the conduits and to effect the operation by vacuum pressure of instruments such as, a bank and turn indicator, a flight indicator, or the like. Similarly, a valve mechanism may be employed for properly connecting the conduits so as to check the vacuum system and indicate the manifold pressure of each engine of a twin engine plane. By way of illustration, the valve assembly is illustrated as including a valve housing having a plurality of inlet ports and a single outlet port, although various other combinations may be developed for particular installations. The outlet port is in communication with a discharge or distributing conduit, and the inlet ports may be connected to separate vacuum pressure conduits. A plurality of valve members is provided, one for each of the inlet ports and these valve members may be selectively operated so that the inlet ports will remain closed or one or another of these inlet ports may be opened, as desired.

An object of the present invention is to provide a valve assembly of the above type wherein a plurality of ports may be simultaneously closed or selectively opened by manipulation of a single operating lever.

Another object of the invention is to provide a valve assembly of the above type wherein a plurality of ports is normally closed by spring-pressed valve members which may be selectively opened by manipulation of a single operating lever.

A further object of the invention is to provide a valve assembly of the above type wherein the valve members are carried by independent levers which may be selectively actuated by the single operating lever.

A still further object of the invention is to provide a valve assembly of the above type wherein the operating lever is positively maintained in any one of the several positions to which it may be shifted for selectively operating the valve members which control the ports.

The invention still further aims to provide a valve assembly of the above type which is compact in construction so as to occupy a minimum amount of space and which is exceptionally simple in construction in order to facilitate the assembly and operation thereof.

The above and other objects of the invention will in part be obvious and will be hereinafter more fully pointed out.

In the accompanying drawings:

Figure 1 is a longitudinal sectional view through the valve casing, showing the valve assembly with the valve members in a closed position, the dotted line position of the operating handle showing one of the valve members shifted away from its seat.

Figure 2 is a top plan view of the valve assembly with the cover plate removed.

Figure 3 is a top view of the valve assembly, taken substantially along the line 3—3 of Figure 1.

Figure 4 is an enlarged fragmentary view, similar to Figure 1, but showing the opposite valve member shifted away from its seat.

Figure 5 is also an enlarged sectional view taken substantially along the line 5—5 of Figure 1.

Referring more in detail to the accompanying drawings, the valve casing or housing includes a body portion 10 which is substantially rectangular in shape and which includes upstanding side walls 11, 11a and end walls 12, 12a. The side wall 11 is provided with inwardly extending bosses 13, 13a and the opposite side wall 11a is provided with similarly positioned inward bosses 14, 14a. Suitable threaded recesses 15 are provided around the valve casing which is adapted to be closed by a cover plate 16. The cover plate is secured to the upstanding walls on the body portion 10 by bolts 17 which engage within the threaded recesses 15. As shown in Figure 5, the sides of the cover plate 16 extend beyond the side walls of the valve casing so as to facilitate the securing of the entire valve assembly to an instrument panel. There is thus provided an internal chamber within the side walls of the body portion 10 and this chamber is closed by the cover plate 16. Pins 18 on the cover plate 16 are adapted to extend into openings 19 in the end walls of the casing so as to properly position the cover plate thereon. Between the ends of the walls of the body and the undersurface of the cover plate 16, there are provided upper and lower sealing gaskets 20, 21, respectively, between which a plate 22 is disposed.

The ends of the body portion within the casing are shaped to provide elevated portions 23, 23a through which ports 24, 24a, respectively, extend. These ports 24, 24a communicate with the inlet conduits 25, 25a, respectively. An outlet port 26 extends centrally through the body portion 10 and is adapted to communicate with a discharge or outlet conduit 27. The conduits 25, 25a may lead from one or more sources of supply and the conduit 27 may lead to the instrument or other device to be operated by the vacuum created. The end walls 12, 12a, are provided with centrally located inward ribs 28, 28a, respectively, which are for the purpose of properly guiding the valve actuating levers in a manner to be hereinafter fully pointed out. Centrally located lugs 29, 29a extend inwardly from opposite sides of the casing and these lugs are provided with V-shaped recesses 30, 30a, respectively. These recesses are in transverse alignment and are for the purpose of pivotally supporting the valve actuating levers as will be hereinafter pointed out.

A lever 31 is provided with depending spaced lugs 32, 32a at one end thereof and these depending lugs are apertured to receive a pivot pin 33, the ends of which are adapted to rest in the recesses 30, 30a. The opposite end of the lever 31 is provided with a longitudinal recess 34 which opens outwardly toward the free end thereof and provides a forked end for the lever. A valve member 35 in the form of a plug has an annular recess 36 around the top thereof and this recess is defined by upper and lower flange portions 37, 38, respectively. This type of valve plug is shown in the co-pending application of Arthur L. Parker Ser. No. 309,083, filed December 13, 1939, and includes a tapered sealing portion 39 which may be of any suitable sealing material. The sealing portion 39 is adapted to cooperate with an inclined valve seat at the end of the port 24. This valve member is carried by the forked end of the lever 31 and the part between the upper and lower flange portions 37, 38 extends within the recess 34 at the end of the lever. Similarly, the rib 28 extends partially within the recess 34 at the end of the lever so as to aid in guiding the lever and to also prevent the valve member from becoming dislodged therefrom. The valve member or plug 35 is thus loosely carried at the free end of the lever 31 so that it may be automatically centered with respect to the seat around the port 24 when closed.

A lever 31a extends toward the opposite end of the casing and the free end thereof is identical with the free end of the lever 31. Thus, the free end of the lever 31a is recessed so as to loosely support a valve member 35a which is identical in construction to the valve member 35. Similarly, the rib 28a extends within the recess at the free end of the lever 31a so as to guide the lever and so as to also prevent the valve member 35a from becoming dislodged therefrom. The inner end of the lever 31a is provided with depending lugs 40, 40a which are disposed outside of the lugs 32, 32a, respectively, on the lever 31. These lugs 40, 40a are also apertured so that the pin 33 can pass therethrough. The lever 31a is provided with an opening 41 therethrough and the inner end 42 of the lever 31 is directed upwardly so that it will extend through the opening 41, as particularly shown in Figures 3 and 4. The inner end 42a of the lever 31a is also directed upwardly with respect to the plane of the lever so that the inner ends of both levers extend upwardly and at an angle to one another when both valve members are closed, as shown in Figure 1. Both levers 31, 31a are thus pivotally supported on the pin 33 and are capable of independent movement with respect to one another. The free ends of the levers 31, 31a are shaped so as to lie in a plane at right angles to the axis of the ports 24, 24a when closed. The valve members will automatically and properly become seated around the ports in this manner.

The cover plate 16 is provided with a central opening 43 therethrough and the inner surface of this opening 43 is shaped to provide a downwardly concaved portion 44. The plate 22 is provided with a depending central portion 45 which is apertured, as at 46, to provide an elongated slot. The inner surface of the portion 45 is shaped to provide an upwardly concaved surface so that this surface and the surface 44 on the cover plate provide a cylindrical shell within which the ball end 47 on the operating handle 48 is secured. The handle 48 is internally bored and threaded to receive the threaded end 49 of a head member 50 which is disposed within the valve chamber. This head member 50 is provided with inclined surfaces 51, 51a which substantially coincide with the inclined ends 42a, 42, respectively, on the levers when the valve members are in a closed position. The head member 50 is provided with a transverse aperture therethrough. A coil spring 52 is disposed within the aperture, the opposite ends of which are closed by plugs 53, 53a which are thus normally forced outwardly by the spring 2.

A bracket member is removably mounted within the valve casing and includes side walls 55, 55a which are disposed within the bosses 13, 13a and 14, 14a, respectively, and on the outside of the head member 50 and the levers 31, 31a. The central bottom portions of the side walls 55, 55a terminate above the pin 33 and are joined by end cross pieces 56, 56a which extend across the top thereof, as particularly shown in Figure 2. The inner edges of the cross pieces 56, 56a are curved so as to receive the depending central portion 45 on the plate 22 and the upper edges of the side walls 55, 55a are cut away at the central portion thereof, as at 57, 57a, to also receive the depending wall portion 45. The side wall 55 is provided with vertical extensions 58, 58a at opposite ends thereof and these extensions are curved to conform with the curvature of the bosses 13, 13a, respectively. Similarly, the side wall 55a is provided with similarly curved extentions 59, 59a which engage the bosses 14, 14a, respectively. The side walls of the bracket member are slightly resilient so as to permit the entire bracket to be inserted in proper position and so that the end extensions thereon will tend to grip the inward bosses.

A spring member extends longitudinally of the casing and includes a central body portion 60 having the central portion thereof depressed so as to accommodate the depending wall portion 45 and this central depressed portion is provided with a longitudinal slot 61 which permits swinging movement of the handle 48 and head member 50. The ends 62, 62a of the spring member extend downwardly from opposite ends of the central body portion 60 and are adapted to bear directly on the upper surface of the flanges 37, 37a of the valve members 35, 35a, respectively. Thus, the ends of the spring member tend to normally force the valve members toward a seated position.

The side wall 55 of the bracket member is provided with a centrally located aperture 63 which is in line with the aperture through the head member 50 when the head member is in a central intermediate position, as shown by the full lines in Figure 1. In this position of the head member, the plug 53 will be forced by the spring 52 outwardly into the aperture 63 so as to locate and position the head member and the handle 48 in this central intermediate position. The side wall 55a is provided with a pair of spaced apertures 64, 64a which are particularly shown in Figures 1 and 4. These apertures are positioned so as to receive the end of the plug 53a when the handle and head member 50 have been shifted to opposite positions from the central intermediate position.

In operation, assuming the valve assembly to be in the position shown by the full lines of Figure 1, the handle 48 and the head member 50 are in a central intermediate position with the surfaces 51, 51a of the head member substantially coinciding with and spaced upwardly from the inclined ends 42a, 42, respectively, on the valve carrying levers. In this position of the valve assembly, the spring 62 bears on the valve member 35 and the spring 62a bears on the valve member 35a so as to force both valve members into their seated positions for closing the ports 24, 24a. The depending central portion of the body 60 of the spring member lies close to the upper edge of the head member 50 so that it is prevented from being buckled or depressed. In this intermediate position of the handle member, the end of the plug 53 will extend into the aperture 63 in the side wall 55 so that the handle member is positively although releasably maintained in this position. When it is desired to open the port 24a in order to permit communication for fluid between this port and the central port 26, the handle member 48 is shifted to the dotted line position shown in Figure 1. During this movement of the handle 48, the pointed end of the head member 50 will engage the upper surface of the inclined end 42a on the lever 31a so that this lever will be shifted in a counter-clockwise direction. During this movement of the lever 31a about the pivot 33, the free end thereof will be elevated so as to shift the valve member 35a away from its seat and thus open the port 24a. This movement of the lever 31a and the valve member 35a is effected against the action of the spring 62a. However, the normal tendency of the spring 62a to force the valve member 35a back to a seated position, is prevented by engagement of the end of the spring-pressed plug 53a in the aperture 64 on the side wall 55a.

When it is desired to close the port 24a and open the port 24, a handle 48 is shifted to the position shown in Figure 4 and during this movement of the handle, the head member 50 will pass through the intermediate position shown in Figure 1. As shown in Figure 4, the pointed edge of the head member 50 will engage the end 42 on the lever 31 so as to shift this lever in a clockwise direction, thus elevating the valve member 35 from its seat. This movement of the valve member is against the action of the spring 62 and will provide fluid communication between the port 24 and the central port 26. In this position of the valve assembly, the end of the plug 53a will engage in the aperture 64a in order to maintain the port 24 opened.

From the foregoing description, it will be seen that the present invention provides a compact and efficient valve assembly wherein the several parts may be rapidly assembled and maintained in assembled position when the cover plate 16 is secured to the casing. Similarly, the valve assembly may be rapidly taken apart so as to replace or repair any damaged or worn elements thereof. The valve assembly is one wherein the valve members for controlling a plurality of ports may be simultaneously maintained in a seated position for closing the several ports. From such a position with all of the inlet ports closed, any one of the valve members may be separately and selectively shifted away from its seat by the proper manipulation of a single operating handle. Furthermore, a spring means is provided for normally maintaining the valve members in a seated position and movement of the operating handle to selectively open one or another of the ports serves to shift the particular valve member against the action of the spring means. For this purpose, the valve assembly includes spring-pressed detent means which serve as a positive, although releasable means for maintaining the operating handle and a valve member in the selected position.

While one form of the invention has been shown for purposes of illustration, it is to be clearly understood that various changes in the details of construction and arrangement of parts may be made without departing from the scope of the invention as set forth in the appended claims.

I claim:

1. A valve assembly for controlling the passage of fluid, comprising a valve casing having a plurality of ports communicating therewith, a plurality of valve members movably mounted within said casing for controlling the passage of fluid through at least a pair of said ports, a bracket member mounted within said casing and having recesses formed in at least one side wall thereof, a single operating lever extending externally of said casing for shifting said valve members whereby to control the passage of fluid through the ports, and a spring-pressed detent carried by said operating lever within the casing and adapted to cooperate with the recesses in said bracket member whereby to releasably hold the lever in any one of the several positions to which it is shifted.

2. A valve assembly for controlling the passage of fluid, comprising a valve casing having a plurality of ports communicating therewith, a plurality of valve members movably mounted within said casing for controlling the passage of fluid through at least a pair of said ports, a bracket member mounted within said casing and having recesses formed in the side walls thereof, a single operating lever extending externally of said casing for shifting said valve members whereby to control the passage of fluid through the ports, a head member on the inner end of said operating lever, and spring-pressed detents carried by said head member and normally forced outwardly thereof for cooperation with the recesses in the side walls of said bracket member whereby to releasably hold the lever in any one of the several positions to which it is shifted.

3. A valve assembly for controlling the passage of fluid, comprising a valve casing having a plurality of ports communicating therewith, at least a pair of levers pivotally mounted within said casing for movement independently of one another, at least a pair of valve members one carried at the free end of each of said levers for controlling the passage of fluid through at least a pair of said ports, said levers having opposed elevated portions defining a cavity therebetween, spring means for normally forcing said valve members toward a seated position whereby to close communication between the ports, and a single operating lever extending externally of said casing and having a head portion adapted to be disposed between the elevated portions on said levers when in an intermediate position and adapted to engage one or the other of said elevated portions when shifted away from an intermediate position whereby to independently and selectively shift one or another of said valve members in order to selectively control the passage of fluid through the ports.

4. A valve assembly for controlling the passage of fluid, comprising a valve casing having a plurality of ports communicating therewith, at least a pair of levers having depending lugs at the inner ends thereof for pivotally mounting the levers within said casing, both of said levers having elevated inner end portions and one of said levers having an opening through which the elevated end portion on the other of said levers extends, at least a pair of valve members one carried at the outer end of each of said levers for controlling the passage of fluid through at least a pair of said ports, and a single operating lever extending externally of said casing and having a head portion disposed between the elevated end portions of said levers and engageable with either of said end portions when shifted from an intermediate position whereby to selectively and independently shift one or another of said levers in order to selectively control the passage of fluid through the ports.

5. A valve assembly for controlling the passage of fluid, comprising a valve casing having a plurality of ports communicating therewith, at least a pair of valve members for controlling the passage of fluid through at least a pair of said ports, means for mounting said valve members for movement independently of one another, a bracket member mounted within said casing, a spring member having the central portion thereof bearing upwardly against said bracket member and having the ends thereof bearing centrally on said valve members whereby to normally force the valve members toward a seated position, a single operating lever extending externally of said casing and cooperating with the mounting means for said valve members for independently and selectively shifting one or another of said valve members against the action of said spring member whereby to selectively control the passage of fluid through the ports, and means associated with said operating lever and cooperating with said bracket member for maintaining the operating lever in any one of the positions to which it is shifted.

6. A valve assembly for controlling the passage of fluid, comprising a valve casing having a plurality of ports communicating therewith, a bracket member having an apertured top wall and side walls engaging the inner surface of said casing, a pair of levers having the inner ends thereof pivotally mounted in said casing within the side walls of said bracket member, a pair of valve members one adjacent the outer end of each of said levers for controlling the passage of fluid through at least a pair of said ports, an externally operable lever pivotally connected to said casing and having a portion thereof extending through the aperture in the top of said bracket member and provided with a head member disposed between the side walls of said bracket member, said head member being engageable with one or the other of said levers when shifted beyond an intermediate position for selectively shifting one or the other of said levers whereby to selectively control the passage of fluid through the ports, and a spring member bearing against the top wall of said bracket member and also against said valve members whereby to normally force the valve members toward a seated position when the head member is in an intermediate position whereby to close communication between the ports.

7. A valve assembly for controlling the passage of fluid, comprising a valve casing having a plurality of ports communicating therewith, a pair of levers pivotally mounted within said casing for movement independently of one another but in the same plane, a pair of valve members one carried by each of said levers for controlling the passage of fluid through at least a pair of the said ports, a single operating handle extending externally of said casing and pivotally mounted thereon for movement in the plane of said levers and having the inner end thereof adapted to selectively operate one or another of said levers whereby to selectively control the passage of fluid through the ports, and a leaf spring mounted within said casing and disposed in the plane of said handle and said levers and bearing against said valve members for normally forcing the said valve members toward a seated position.

8. A valve assembly for controlling the passage of fluid, comprising a valve casing having a plurality of ports communicating therewith, a pair of levers pivotally mounted within said casing for movement independently of one another and having adjacent oppositely inclined surfaces defining a cavity, a pair of valve members one carried by each of said levers for controlling the passage of fluid through at least a pair of said ports, spring means normally tending to shift said levers with the valve members toward a seated position, and a single operating lever extending externally of said casing and having the inner end thereof disposed between the said oppositely inclined surfaces in a neutral position and adapted to engage one or another of said inclined surfaces for selectively shifting one or another of the levers whereby to selectively control the passage of fluid through the ports.

9. A valve assembly for controlling the passage of fluid comprising a valve casing having a port at each side thereof, a valve member for each port, an actuating lever supporting each valve member, said actuating levers being pivotally mounted on a common pivot member disposed centrally between said ports and independently operable thereon, a single operating lever located midway between said ports and extending externally of the casing and carrying an actuating head within the casing for operating said actuating levers, each actuating lever being extended beyond its pivot and shaped so that when said operating lever is selectively moved toward a port the actuating lever carrying the valve controlling said port will be shifted for raising the valve, and spring means for normally holding the valves closed when the operating lever is in central position.

ARTHUR L. PARKER.